US006865159B2

(12) United States Patent
Weaver

(10) Patent No.: US 6,865,159 B2
(45) Date of Patent: Mar. 8, 2005

(54) SYSTEM AND METHOD FOR COMFORT NOISE PRODUCTION

(75) Inventor: Jeffrey S. Weaver, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 535 days.

(21) Appl. No.: 09/981,536

(22) Filed: Oct. 2, 2001

(65) Prior Publication Data

US 2003/0063578 A1 Apr. 3, 2003

(51) Int. Cl.[7] .............................................. H04L 12/26
(52) U.S. Cl. ..................................... 370/250; 370/352
(58) Field of Search ................................. 370/289, 401, 370/250, 352, 468, 399, 252, 528, 459, 395.52, 431; 379/392.01, 391, 416, 406.01

(56) References Cited

U.S. PATENT DOCUMENTS 6,535,521 B1 * 3/2003 Barghouti et al. .......... 370/462
6,577,862 B1 * 6/2003 Davidson et al. ........... 370/433

* cited by examiner

*Primary Examiner*—Chi Pham
*Assistant Examiner*—Alexander O. Boakye

(57) ABSTRACT

A method and system are provided for producing comfort noise during conversational pauses in the course of a telephone call over an IP network, the IP network including a transmitting computer for transmitting a voice signal generated by a telephone and a receiving computer for receiving the voice signal. The method comprises detecting a conversational pause at the transmitting computer; stopping the transmission of voice data packets during the pause; and transmitting a message to the receiving computer directing the receiving computer to produce comfort noise. In some embodiments of the invention, the message may take the form of a single packet of data.

19 Claims, 3 Drawing Sheets

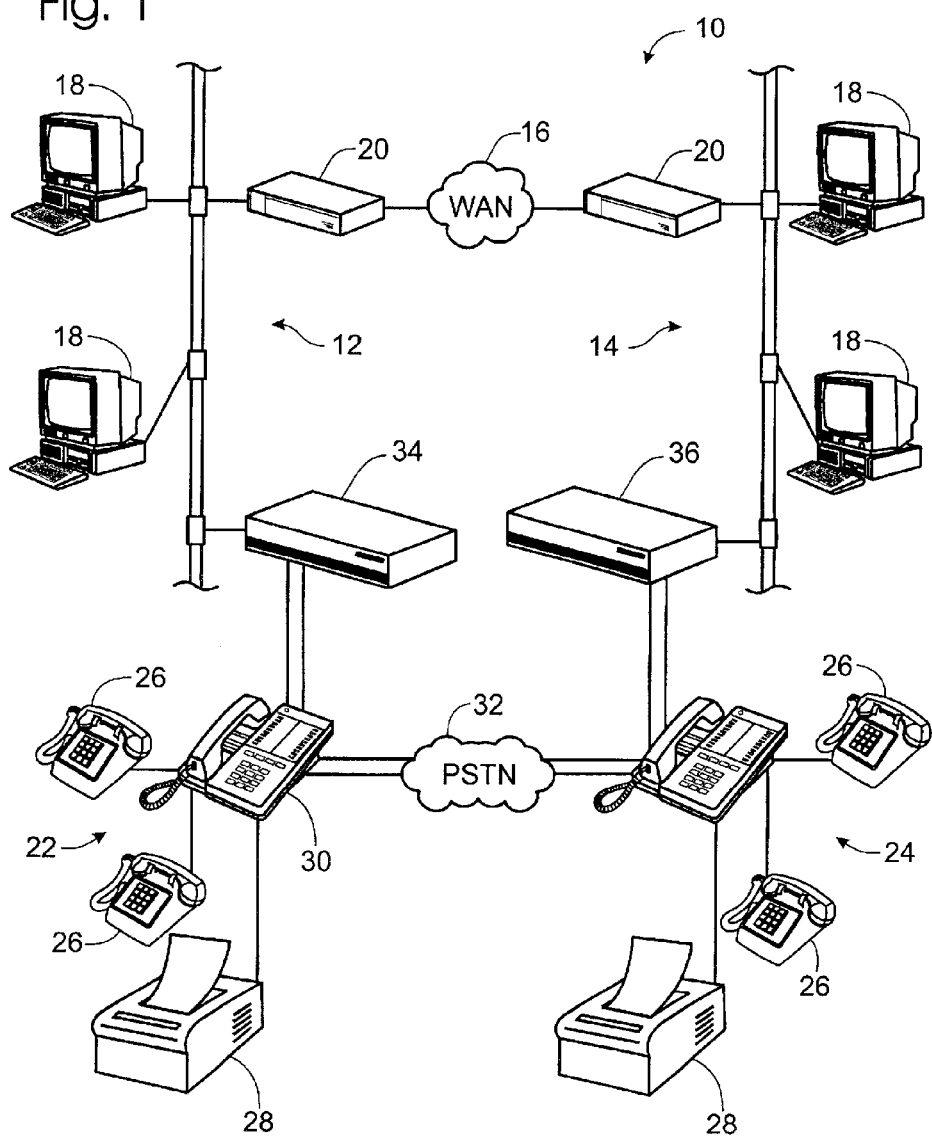

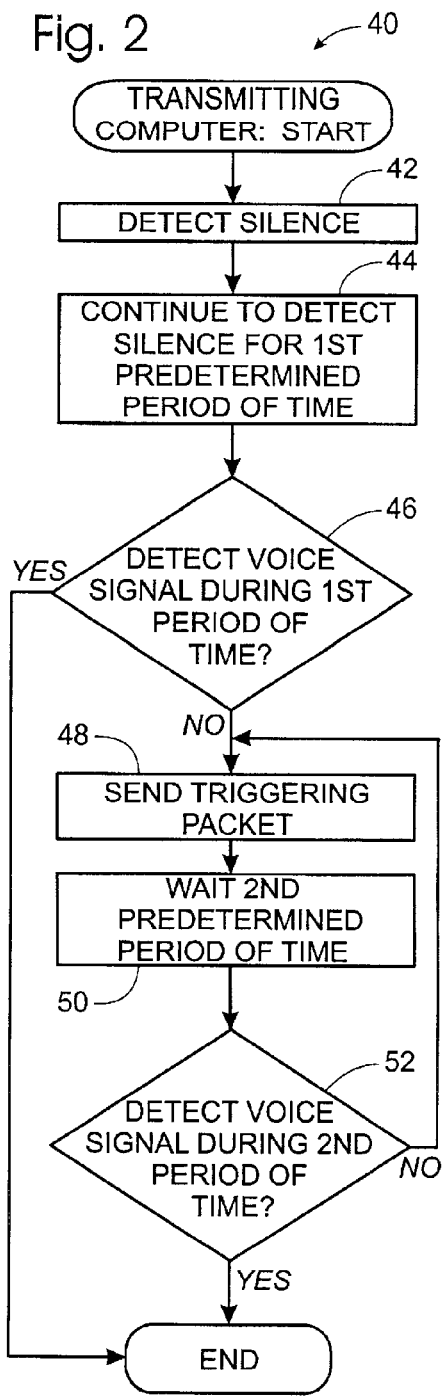
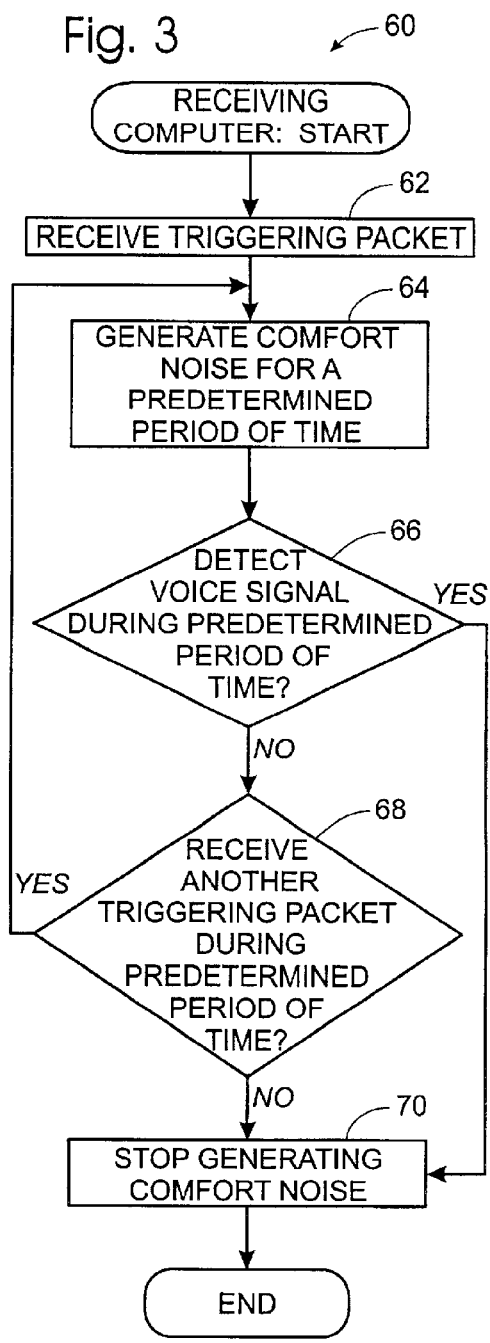

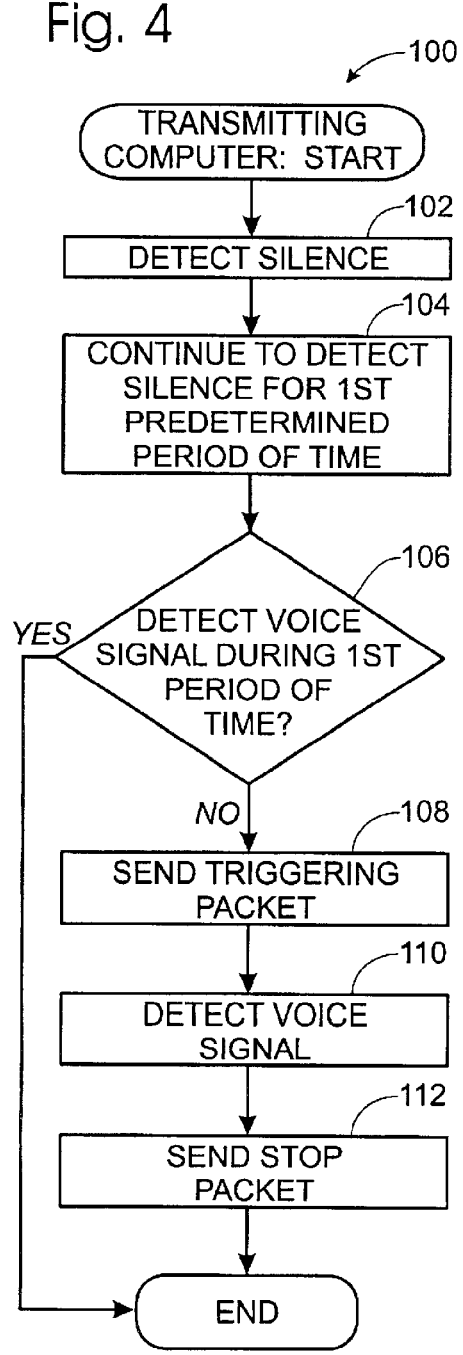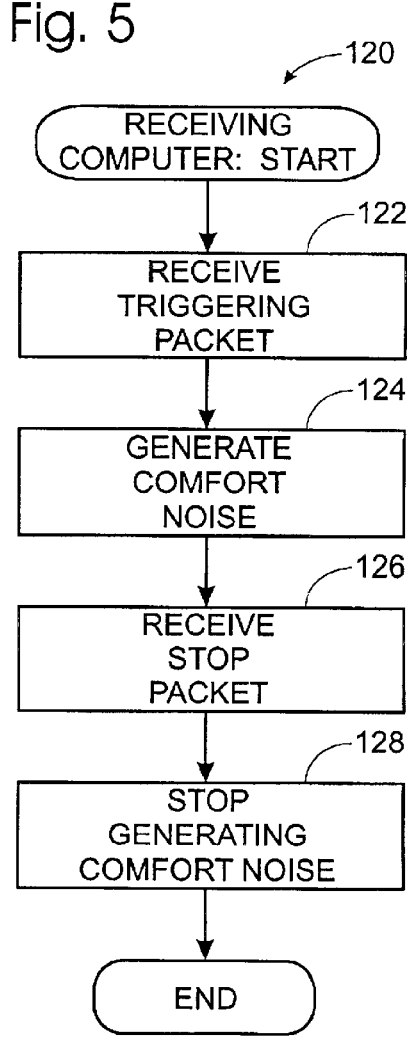

SYSTEM AND METHOD FOR COMFORT NOISE PRODUCTION

TECHNICAL FIELD

The present invention relates to the generation of comfort noise during a telephone call over a data network. More particularly, the present invention provides a method of producing comfort noise by sending a triggering message from a transmitting computer to a receiving computer to trigger generation of the comfort noise by the receiving computer.

BACKGROUND OF THE INVENTION

Converged networks, in which data and voice are transmitted over the same network, are becoming increasingly popular. Transmitting voice via a data network offers several advantages over the use of a traditional voice network. For example, long-distance calls over a traditional voice network generally have a higher cost than long-distance calls over a data network. Because voice signals are transformed to data during a telephone call over a data network, calls made over a wide area data network (WAN) generally cost no more than calls made over a local area network (LAN), as the cost of sending data across a data network is generally not a function of the distance between the communicating parties. Thus, long-distance calls over a data network cost no more than local calls.

The equipment necessary to enable voice transmission over a data network generally includes a gateway, which is a computer used to interface an analog telephone line to the data network. The gateway converts voice signals to and from the correct format for the data network protocols, and also may compress the voice data, demodulate fax signals, etc. Many different network protocols may be used to send voice data. Because of the widespread implementation of versions of the internet protocol (IP) over both LANs and WANs, IP is becoming the most common network protocol for voice transmission.

With traditional voice networks, each telephone call takes place over a dedicated circuit that is established for the call and maintained open until the call is terminated. Because of this, the amount of network resources used by a single telephone call is generally proportional to the duration of the telephone call and the physical distance separating the ends of the call. In contrast, because no dedicated circuit is kept open during a telephone call over a data network, the amount of network resources used by the telephone call is generally proportional to the amount of data sent during the call (and increased if a priority scheme is used to increase the transmission rate of the telephone call).

To decrease the bandwidth used by a telephone call over a data network, many gateways utilize silence suppression technology. Silence suppression technology recognizes periods of silence in a conversation, and stops the transmission of data packets across the network during these periods. Silence suppression effectively allows two people to talk in almost half the bandwidth that would be needed for a conversation in a true full-duplex communication mode. However, silence suppression also causes the line to sound completely quiet or dead to a listener on the receiving end, which can be disconcerting to the listener.

To compensate for the dead line sound caused by silence suppression, "comfort noise" is sometimes generated to let a listener know that the communication path is still open. Comfort noise is artificial white noise that sounds like background noise heard during a voice-network telephone call, and makes a telephone call over a data network sound more like a familiar voice-network telephone call.

Because comfort noise makes a telephone call held over a data network sound more like an ordinary voice network telephone call, it may make data-network calls more appealing to users. However, current methods of generating comfort noise also may have drawbacks. First, when comfort noise is generated by transmitting-side equipment, a continuous stream of packets of noise data are still being sent across the network. This wastes network bandwidth, and thus somewhat negates the advantages of using silence suppression. Second, when comfort noise is generated by receiving-side equipment, problems may arise with holdover time (the time between the beginning of a conversational pause and the beginning of the generation of comfort noise) and front-end clipping (the cutting of the first sounds of words) due to possible errors in recognizing the beginnings and ends of words or conversational phrases.

SUMMARY OF THE INVENTION

The present invention provides a method of causing the production of comfort noise during conversational pauses in the course of a telephone call over an IP network, the IP network including a transmitting computer for transmitting a voice signal generated by a telephone and a receiving computer for receiving the voice signal. The method involves detecting a conversational pause at the transmitting computer, and then transmitting a message to the receiving computer directing the receiving computer to produce comfort noise. In some embodiments of the invention, the message may take the form of a single packet of data.

BRIEF DESCRIPTION OF THE DRAWINGS

FIG. 1 is a schematic diagram of a converged voice/data network.

FIG. 2 is a flow diagram depicting a first embodiment of a method for a transmitting computer to trigger the production of comfort noise by a receiving computer.

FIG. 3 is a flow diagram depicting a first embodiment of a method for a receiving computer to be triggered by a transmitting computer to generate comfort noise.

FIG. 4 is a flow diagram depicting a second embodiment of a method for a transmitting computer to trigger the production of comfort noise by a receiving computer.

FIG. 5 is a flow diagram depicting a second embodiment of a method for a receiving computer to be triggered by a transmitting computer to generate comfort noise.

DETAILED DESCRIPTION OF THE PREFERRED EMBODIMENTS

The present invention provides an improved method for indicating the existence of a connection to a listener on a telephone call over a data network, and may be implemented on any desired packet data network. FIG. 1 shows generally at 10 an exemplary converged data/voice network. Converged network 10 includes a first LAN 12 and a second LAN 14 connected to each other over a WAN 16. Each LAN 12 and 14 typically includes a plurality of data storage, processing and transmission devices, such as personal computers 18. Furthermore, each LAN 12 and 14 are linked to WAN 16 with a router 20.

Converged network 10 also includes a first local voice network 22 and a second local voice network 24. First and second local voice networks 22 and 24 each include one or more telephones 26 and/or fax machines 28 connected to a private branch exchange 30 (PBX). Each PBX 30 has connections both to a public switched telephone network 32 (PSTN), and to a gateway for interfacing local voice networks 22 and 24 with LANs 12 and 14. First LAN 12 is interfaced with first local voice network 22 via a first gateway 34, and second LAN 14 is interfaced with second local voice network 24 via a second gateway 36.

To make a call over data network 10 from first local voice network 22, an access number must first be dialed that tells PBX 30 to route the call to first gateway 34 instead of to PSTN 32. First gateway 34 digitizes, compresses and packetizes the voice signal, and then sends the voice packets onto first LAN 12. Each voice data packet is routed onto and over WAN 16, and then onto second LAN 14. Second gateway 36 receives the voice data packets, reassembles and decompresses the voice data, and converts the voice data to analog for transmission to a telephone on second voice network 24.

When a first user is talking on a telephone on first voice network 22 and a second user is listening on a telephone on second voice network 24, first gateway 34 acts as a transmitting computer, and second gateway 36 acts as a receiving computer. When silence suppression is enabled, second gateway 36 suspends transmission of data to first gateway 34 while the second user is not talking. Likewise, when the first user is listening and the second user is talking, second gateway 36 acts as a transmitting computer and first gateway 34 acts as a receiving computer. In this situation, first gateway 34 stops transmitting data while the first user is silent. Thus, each of gateways 32 and 34 acts as both a sending computer and a receiving computer, depending upon the direction of data flow.

FIGS. 2 and 3 show a first embodiment of a method of producing comfort noise according to the present invention. FIG. 2 shows generally, at 40, a first method for transmitting computer 34 to trigger the production or generation of comfort noise, and FIG. 3 shows generally, at 60, a first method for receiving computer 36 to produce comfort noise in response to being triggered by the transmitting computer. As used herein, "produce" or "generate" means to originate a comfort noise signal at receiving computer 36, rather than to receive, assemble and decompress packetized noise data.

Referring first to FIG. 2, method 40 is initiated when the transmitting computer detects a silent period in the conversation at 42. Silence detection is generally a specified time period with signal level below a predetermined threshold, as described in more detail below. Thus, this specified time period is indicated at 44 as the step of continuing to detect silence. During this time period, the voice signal transmission is not interrupted. The selection of an appropriate time period for silence detection lessens the likelihood that the pause is a mid-sentence pause between words, as explained in more detail below.

Next, if no voice signal is detected at 46 during the first predetermined period of time, then the transmitting computer sends a triggering packet to the receiving computer at 48. The triggering packet contains no sound data. Instead, it is merely a "token" packet, containing a small amount of data (as little as one bit) telling receiving computer 36 to create or generate comfort noise for a listener on the receiving end of the telephone call. On the other hand, if a voice signal is detected during the first predetermined period of time, then the routine is terminated. Each of these steps will be described in more detail below.

After sending a triggering packet to the receiving computer, the transmitting computer waits a second predetermined period of time at 50. If no incoming voice signal is detected during the second predetermined period of time, then the transmitting computer loops back to step 48 and sends another triggering packet to the receiving computer. The loop defined by steps 48 through 50 continues until a voice signal is redetected at the transmitting computer, or until the call is terminated.

Next referring to FIG. 3, method 60 is initiated on the receiving computer when the receiving computer receives a triggering packet at 62. Upon receipt of a triggering packet, the receiving computer then begins to generate comfort noise at 64. The generation of comfort noise continues for a predetermined "generation" period, during which the receiving computer waits both for more voice packets at 66 and for another triggering packet at 68. If a voice packet is received during the generation period at 66, then the generation of comfort noise is terminated. Similarly, if no other triggering packet is received at 68 during the generation period, then the generation of comfort noise is terminated at 70. The failure to receive another triggering packet in the absence of receiving another voice data packet may indicate a transmission problem, in which case the termination of comfort noise may alert the listener to such a problem. If, however, another triggering packet is received during the predetermined period of time at 68, then the generation of comfort noise is continued and the predetermined period of time is reset.

The basic steps of methods 40 and 60, as shown in FIGS. 2 and 3, may be performed with many possible variations. For instance, detecting silence at 42 may be performed in any suitable manner. As an example, the transmitting computer could be configured to monitor the amplitude of an incoming analog telephone signal, and a sufficiently low value for the amplitude relative to the average amplitude could be designated as "silence." In this manner, a conversational pause could be detected by a drop in the level of the voice signal below the designated amplitude.

Waiting a first predetermined period of time at 44 after detecting silence but before sending a triggering packet could also be performed in any desired manner and for any desired time interval. This first period of time will generally be optimized with regard to the amplitude threshold chosen to be the "silence" threshold to make VoIP calls over the network sound as smooth as possible. An example of a range of suitable waiting times is 10–50 milliseconds, although times either above or below this range may also be used. Furthermore, it will be appreciated that waiting a first predetermined period of time at 44 could be omitted from method 40 entirely without departing from the scope of the present invention. If, however, it is omitted, then the transmitting computer may suspend transmission of voice data at each pause between words in a conversation, which may give the conversation a choppy feel. Therefore, it is preferred to wait a predetermined time at 44 before sending out a triggering packet at 48.

Any suitable triggering packet or message may be sent to the receiving computer at 48. The triggering packet will generally have an ordinary IP packet structure, with a header containing the address of the destination gateway, and a data portion. The data portion may contain any desired data suitable to cause the receiving computer to produce comfort noise. Typically, the data portion of the triggering packet will be relatively small (as small as one bit) to use less bandwidth on data network 10.

After the triggering packet is sent at 48, the transmitting computer waits a second predetermined time interval before sending another triggering packet. The second predetermined time interval may have any desired duration (which may be limited by connection timeouts), typically from 50 milliseconds to 10 seconds. If a voice signal is detected during this time interval, the transmitting computer will generally begin transmitting voice data immediately, without waiting until the end of the predetermined time interval, signaling the receiving computer to cease playback of comfort noise and instead resume normal decoding and playback of the voice data.

Next, regarding method 60, the receiving computer may generate comfort noise at 64 for any desired predetermined period of time. Preferably, the length of the predetermined period of time at 64 is greater than the second predetermined period of time in method 40 for which the transmitting computer waits at 50 after sending a triggering packet at 48. This would prevent the receiving computer from stopping the generation of comfort noise between the receipt of triggering packets, thus giving the comfort noise intervals a smoother, unbroken sound.

FIGS. 4 and 5 show a second embodiment of a method of producing comfort noise according to the present invention. FIG. 4 shows generally at 100 a second method performed by a transmitting computer for triggering the production of comfort noise, and FIG. 5 shows generally at 120 a method performed by a receiving computer in response to method 100.

Referring first to FIG. 4, method 100 is initiated when the transmitting computer detects silence in the form of a conversational pause at 102. As described above, silence detection is generally a specified time period with signal level below a predetermined threshold. Thus, this specified time period is indicated at 104 as the step of continuing to detect silence. Next, if no voice signal is detected at 106 during the first predetermined period of time, then the transmitting computer sends a triggering packet, or other triggering message, to the receiving computer at 108. Next, once a voice signal is again detected at 110, a stop packet is sent to the receiving computer at 112, signaling the receiving computer to discontinue the production of comfort noise. The stop packet may be either a token packet containing some type of data other than voice or sound data, or may be the first voice data packet corresponding to a new conversational phrase, as noted above.

In contrast to method 40, triggering packets are not sent periodically to the receiving computer in method 100. Instead, a single triggering packet or message is used to trigger the production of comfort noise, and another message is sent to terminate the production of comfort noise when voice data resumes. The triggering packet or message may take any suitable form. Indeed, each step of method 100 may proceed in a fashion similar to those described above for method 40, and many variations may be made to the steps of method 110 without departing from the scope of the present invention.

Next referring to FIG. 5, method 120 is initiated on the receiving computer when the receiving computer receives a triggering packet at 122. Upon receipt of a triggering packet, the receiving computer then begins to generate comfort noise at 124. Unlike the generation of comfort noise in method 60, the generation of comfort noise at 124 does not continue for a predetermined time interval. Instead, comfort noise is generated continuously until another packet is received from the transmitting computer. For example comfort noise could be generated until a voice data packet is received from the transmitting computer at 126. Likewise, the generation of comfort noise could continue until the receiving computer receives any other desired type of data packet from the transmitting computer, for example a single token packet or a series of token packets indicating that a voice signal will be following. Upon receiving the voice data (or other) packet at 126, the receiving computer stops the generation of comfort noise at 128 until another triggering packet is received, restarting method 120.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

I claim:

1. A method of triggering production of comfort noise during a telephone call over an IP network, the IP network including a transmitting computer for transmitting a voice signal generated by a telephone and a receiving computer for receiving the voice signal, the method comprising:

detecting a silent period in a voice signal at the transmitting computer wherein detecting a silent period in the voice signal at the transmitting computer includes detecting a drop in the voice signal amplitude below a predetermined threshold;

sending a triggering packet from the transmitting computer to the receiving computer;

receiving the triggering packet at the receiving computer; and generating comfort noise at the receiving computer in response to receiving the triggering packet.

2. A method of triggering production of comfort noise during a telephone call over an IP network, the IP network including a transmitting computer for transmitting a voice signal generated by a telephone and a receiving computer for receiving the voice signal, the method comprising:

detecting a silent period in a voice signal at the transmitting computer;

sending a triggering packet from the transmitting computer to the receiving computer;

receiving the triggering packet at the receiving computer;

generating comfort noise at the receiving computer in response to receiving the triggering packet; and waiting a first predetermined period of time after detecting a silent period before sending the triggering packet.

3. The method of claim 2, wherein the triggering packet is withheld if a voice signal is detected during the first predetermined period of time.

4. A method of triggering production of comfort noise during a telephone call over an IP network, the IP network including a transmitting computer for transmitting a voice signal generated by a telephone and a receiving computer for receiving the voice signal, the method comprising:

detecting a silent period in a voice signal at the transmitting computer; sending a triggering packet from the transmitting computer to the receiving computer;

receiving the triggering packet at the receiving computer;

generating comfort noise at the receiving computer in response to receiving the triggering packet; and wherein sending a triggering packet includes periodically sending a triggering packet until a voice signal is detected.

5. A method of triggering production of comfort noise during a telephone call over an IP network, the IP network including a transmitting computer for transmitting a voice signal generated by a telephone and a receiving computer for receiving the voice signal, the method comprising:

detecting a silent period in a voice signal at the transmitting computer;

sending a triggering packet from the transmitting computer to the receiving computer;

receiving the triggering packet at the receiving computer;

generating comfort noise at the receiving computer in response to receiving the triggering packet; and wherein the comfort noise is generated for a second predetermined amount of time.

6. The method of claim 5, wherein the generation of comfort noise is discontinued after the predetermined amount of time has passed unless another triggering packet is received during the predetermined amount of time.

7. A method of triggering production of comfort noise during a telephone call over an IP network, the IP network including a transmitting computer for transmitting a voice signal generated by a telephone and a receiving computer for receiving the voice signal, the method comprising:

detecting a silent period in a voice signal at the transmitting computer;

sending a triggering packet from the transmitting computer to the receiving computer;

receiving the triggering packet at the receiving computer;

generating comfort noise at the receiving computer in response to receiving the triggering packet; and wherein comfort noise is generated continuously after receiving a triggering packet until a stop packet is received from the transmitting computer.

8. The method of claim 7, wherein the stop packet is a packet containing voice data.

9. The method of claim 7, wherein the stop packet is a token packet that precedes a voice signal packet.

10. A method of producing comfort noise during conversational pauses in the course of a telephone call over an IP network, the IP network including a transmitting computer for transmitting a voice signal generated by a telephone and a receiving computer for receiving the voice signal, the method comprising:

detecting a conversational pause at the transmitting computer;

stopping the transmission of voice data packets during the pause;

directing the receiving computer to produce comfort noise for a user of a telephone connected to the receiving computer; and periodically sending a data packet to the receiving computer.

11. A method of causing the production of comfort noise during a telephone call over an IP network, the IP network including a transmitting computer that transmits voice data and a receiving computer that receives voice data, the method comprising:

detecting silence in the voice signal at the transmitting computer;

sending a triggering packet from the transmitting computer to the receiving computer to trigger the receiving computer to generate comfort noise for a first predetermined period of time;

waiting a second predetermined period of time; and if no voice signal is detected by the transmitting computer during the second predetermined period of time, repeating the sending and waiting steps.

12. The method of claim 11, wherein the second predetermined period of time is longer than the first predetermined period of time.

13. An IP telephone system configured to transmit a voice signal produced at a telephone over an IP network, the IP telephone system comprising:

a transmitting computer configured to be connected to a first telephone and to the IP network; and a receiving computer configured to be connected to a second telephone and to the IP network;

wherein the transmitting computer is configured to detect a pause in a voice signal from the first telephone and to transmit a triggering packet to the receiving computer upon detection of the pause; and wherein the receiving computer is configured to receive the triggering packet and, upon receipt of the triggering packet, to generate a comfort noise for a listener on the second telephone.

14. The IP telephone system of claim 13, wherein the transmitting computer is configured to periodically send a triggering packet to the receiving computer until a voice signal is detected.

15. The IP telephone system of claim 13, wherein the receiving computer is configured to generate comfort noise for a predetermined generating period upon receipt of the triggering packet.

16. The IP telephone system of claim 13, wherein the transmitting computer is configured to send a single triggering packet to the receiving computer upon detection of the pause.

17. The IP telephone system of claim 16, wherein the receiving computer is configured to generate the comfort noise for the listener continuously until a stop packet is received by the receiving computer from the transmitting computer.

18. The IP telephone system of claim 17, wherein the stop packet is a voice data packet.

19. The IP telephone system of claim 17, wherein the stop packet is a token packet sent by the transmitting computer upon detecting a voice signal.

* * * * *